US012575587B2

(12) United States Patent
Rieper

(10) Patent No.: US 12,575,587 B2
(45) Date of Patent: Mar. 17, 2026

(54) SECURE, EASILY MANIPULATED, MANUALLY OPERATABLE PRESSURE RELIEF VALVE FOR USE WITH A PRESSURIZED FOOD DISPENSING SYSTEM

(71) Applicant: FBD PARTNERSHIP, L.P., San Antonio, TX (US)

(72) Inventor: Robert A Rieper, Converse, TX (US)

(73) Assignee: FBD Partnership, LP, San Antonio, TX (US)

( * ) Notice: Subject to any disclaimer, the term of this patent is extended or adjusted under 35 U.S.C. 154(b) by 671 days.

(21) Appl. No.: 17/810,506

(22) Filed: Jul. 1, 2022

(65) Prior Publication Data

US 2024/0000102 A1     Jan. 4, 2024

(51) Int. Cl.
| | |
|---|---|
| *F16K 17/04* | (2006.01) |
| *A23G 9/04* | (2006.01) |
| *A23G 9/28* | (2006.01) |
| *F16K 39/06* | (2006.01) |

(52) U.S. Cl.
CPC ............... *A23G 9/28* (2013.01); *A23G 9/045* (2013.01); *F16K 17/04* (2013.01); *F16K 39/06* (2013.01)

(58) Field of Classification Search
CPC ..... F16K 17/0486; F16K 15/182; A23G 9/28; A23G 9/045
USPC .................. 137/384.6, 492.5, 871, 877, 878; 251/337, 364
See application file for complete search history.

(56) References Cited

U.S. PATENT DOCUMENTS

| | | | |
|---|---|---|---|
| 2,236,620 A | 4/1941 | Cornelius | |
| 2,276,811 A | 3/1942 | Ward | |
| 2,562,638 A | 7/1951 | Philipp | |
| 2,562,672 A * | 7/1951 | Kunert ................... | F16K 17/048 |
| | | | 137/71 |
| 2,610,478 A | 9/1952 | Lofstedt | |
| 2,735,276 A | 2/1956 | Thompson | |
| 2,934,911 A | 5/1960 | Micai et al. | |
| 3,030,976 A | 4/1962 | Brown | |
| 3,189,040 A * | 6/1965 | Johnson ................ | F16K 17/044 |
| | | | 137/542 |
| 3,280,459 A | 10/1966 | Walker | |
| 3,468,137 A | 9/1969 | Welty | |
| 3,517,524 A | 6/1970 | Armin | |
| 3,661,303 A | 5/1972 | Prosenbauer | |
| 3,677,272 A | 7/1972 | Shrank | |
| 4,168,723 A * | 9/1979 | Schneider ............. | F16K 17/168 |
| | | | 137/614.19 |

(Continued)

FOREIGN PATENT DOCUMENTS

| | | |
|---|---|---|
| WO | 2009124786 | 10/2009 |

*Primary Examiner* — Paul R Durand
*Assistant Examiner* — Randall A Gruby
(74) *Attorney, Agent, or Firm* — McAughan Deaver PLLC

(57) ABSTRACT

A pressurized food dispensing system including a temperature-controlled barrel, a faceplate coupled to one end of the barrel, a touch-screen activated dispense valve, and a relief valve assembly coupled to the face plate where the relief valve assembly includes: a plug coupled to the face plate, an outer knob, releasably coupled to the plug, and a pin defining a generally conical end about which an O-ring is positioned wherein a spring biases the relief valve assembly towards a closed orientation in which the generally conical element extends into the relief passageway defined by the faceplate and the O-ring is compressed against the faceplate to form a seal.

20 Claims, 6 Drawing Sheets

(56)            References Cited

U.S. PATENT DOCUMENTS

| | | | | |
|---|---|---|---|---|
| 4,201,558 | A | 5/1980 | Schwitters et al. | |
| 4,213,795 | A | 7/1980 | Ernstsson | |
| 4,226,261 | A * | 10/1980 | Ekeleme, Jr. | F16K 17/082 |
| | | | | 137/477 |
| 4,276,901 | A * | 7/1981 | Lyons | F16K 15/026 |
| | | | | 137/473 |
| 4,590,970 | A | 5/1986 | Mott | |
| 4,616,677 | A * | 10/1986 | Krechel | F16K 17/168 |
| | | | | 137/881 |
| 4,632,275 | A | 12/1986 | Parks | |
| 4,719,056 | A | 1/1988 | Scott | |
| 4,736,600 | A | 4/1988 | Brown | |
| 4,745,853 | A | 5/1988 | Hoover | |
| 4,784,697 | A | 11/1988 | Bordini | |
| 5,270,013 | A | 12/1993 | Decker | |
| 5,388,925 | A | 2/1995 | Wilcox | |
| 5,553,756 | A | 9/1996 | Topper | |
| 5,632,411 | A | 5/1997 | Harty | |
| 5,740,844 | A | 4/1998 | Miller | |
| 5,899,077 | A | 5/1999 | Wright | |
| 5,974,824 | A | 11/1999 | Galockin | |
| 6,161,558 | A | 12/2000 | Franks | |
| 6,189,745 | B1 | 2/2001 | Frank | |
| 6,296,153 | B1 | 10/2001 | Bilskie et al. | |
| 6,622,510 | B2 | 9/2003 | Giroux et al. | |
| 6,708,510 | B2 | 3/2004 | Sulc et al. | |
| 7,114,707 | B2 | 10/2006 | Rona et al. | |
| 7,562,793 | B2 | 7/2009 | Ufheil | |
| 8,079,230 | B2 | 12/2011 | Frank | |
| 8,136,363 | B2 | 3/2012 | Ludwig | |
| 8,528,786 | B2 | 9/2013 | Gates | |
| 8,646,286 | B2 | 2/2014 | Scherer et al. | |
| 8,701,939 | B2 | 4/2014 | Frank | |
| 9,107,449 | B2 | 8/2015 | Njaastad et al. | |
| 9,173,521 | B2 | 11/2015 | Gates | |
| 9,388,033 | B2 | 7/2016 | Gates | |
| 9,457,386 | B2 | 10/2016 | Gates | |
| 9,638,434 | B2 | 5/2017 | Alston | |
| 9,970,696 | B2 | 5/2018 | Hegar et al. | |
| 10,034,488 | B2 | 7/2018 | Graczyk | |
| 10,321,699 | B2 | 6/2019 | Gates | |
| 10,327,455 | B2 | 6/2019 | Gates | |
| 10,337,633 | B2 * | 7/2019 | Grenaway | F16K 17/06 |
| 2002/0043071 | A1 | 4/2002 | Frank | |
| 2006/0186137 | A1 | 8/2006 | Till | |
| 2007/0017234 | A1 | 1/2007 | Moulder | |
| 2007/0062212 | A1 | 3/2007 | Frank | |
| 2007/0125104 | A1 | 6/2007 | Ehlers | |
| 2008/0073609 | A1 | 3/2008 | Akkermann | |
| 2008/0202130 | A1 | 8/2008 | Kadyk | |
| 2008/0203113 | A1 | 8/2008 | Groh | |
| 2008/0254180 | A1 | 10/2008 | Windhab | |
| 2008/0289357 | A1 | 11/2008 | Skobel | |
| 2008/0302824 | A1 | 12/2008 | Blomme | |
| 2009/0211269 | A1 | 8/2009 | Gist et al. | |
| 2010/0044395 | A1 | 2/2010 | Webb | |
| 2010/0293965 | A1 | 11/2010 | Frank | |
| 2010/0319389 | A1 | 12/2010 | Yang et al. | |
| 2011/0042414 | A1 | 2/2011 | Tachibana | |
| 2011/0049190 | A1 | 3/2011 | Sevcik | |
| 2011/0192423 | A1 | 8/2011 | Boussemart | |
| 2012/0181287 | A1 | 7/2012 | Holbeche | |
| 2013/0140328 | A1 | 6/2013 | Gates | |
| 2014/0061345 | A1 | 3/2014 | Machovina | |
| 2014/0209635 | A1 | 7/2014 | Gates | |
| 2016/0229675 | A1 | 8/2016 | Popov | |
| 2016/0245564 | A1 | 8/2016 | Frank | |
| 2016/0245573 | A1 | 8/2016 | Frank | |
| 2017/0027185 | A1 | 2/2017 | Acosta | |
| 2017/0027188 | A1 | 2/2017 | Raybin | |
| 2017/0030467 | A1 | 2/2017 | Versteeg | |
| 2017/0064977 | A1 | 3/2017 | Refrige | |
| 2018/0103656 | A1 | 4/2018 | Acosta | |
| 2018/0106515 | A1 | 4/2018 | Cobabe | |

* cited by examiner

100

100

140

150

150

164

158

166

150

166

164

162

160

158

152

156

200

220

300

210

300

210

SECURE, EASILY MANIPULATED, MANUALLY OPERATABLE PRESSURE RELIEF VALVE FOR USE WITH A PRESSURIZED FOOD DISPENSING SYSTEM

BACKGROUND OF THE INVENTION

The present inventions relate to relief valve than can be securely used in various devices, including a pressurized food dispensing system.

In most pressurized food dispensing systems, a food product, for example a drink product, is maintained in a pressurized food containment volume. Pressure venting in such systems is desirable for at least two general reasons:

First, pressure venting is desirable to automatically relieve pressure for safety purposes. Under certain circumstances, it is possible that a high pressure to build up in the containment volume that is beyond the handling capability of that volume's components. The provision of pressure venting under such conditions functions as a mechanical safety, relieving pressure above a predetermined level.

Second, pressure venting is desirable to relieve pressure for normal operating purposes. There are several reasons an operator of the dispensing system may want to relieve pressure inside the containment volume on command, such as, for example, filling, purging, and cleaning the containment volume.

In known systems a vent relief assembly provides pressure venting in the circumstances described above. FIGS. 1A-1C illustrate one known vent relief assembly that can be used in conjunction with a food dispensing system dispensing system and in particular in conjunction with a frozen carbonated beverage dispensing system. As shown in FIG. 1A, the illustrated pressurized food dispensing system includes, in pertinent part, a food containment vessel in the form of a freezing barrel 100. A faceplate 140 is attached to the freezing barrel. Contained within the faceplate is a vent relief assembly 150.

Details of this known vent relief assembly 150 are reflected in FIGS. 1B and 1C. As shown in these figures, the illustrated known vent relief assembly includes a pin 152 that defines a sealing surface, a relatively flat over molded stopper 156, a spring 158, a washer 160, an O-ring 162, a plug 164, and a ring 166 that fits through an opening in the pin 152.

In the illustrated known embodiment, in use, the plug is used to couple the assembly 150 to a faceplate 140. This is commonly done using screw threads.

During normal operation, the spring 158 holds the stopper 156 against a portion of the faceplate 140 to create a seal. If the pressure within the freezing barrel 100 gets too high, it will act against the stopper 156 to cause it to automatically move to an open position which will release the pressure within the barrel 100. If a manual pressure release is desired, a user can grasp the ring 166 and pull it out, thus causing stopper 156 to manually move to an open position.

Vent assemblies like the known vent assembly 150 described above are not ideal for several reasons. For example, to facilitate desired manual pressure venting by an operator of the dispensing system, the extending ring of the relief valve assembly 150 is located on the side of the faceplate that faces a user of the system during a dispense procedure. While facilitating manual pressure venting, such an arrangement may invite a user seeking to dispense the food item within the containment vessel 100 to grasp and pull the ring element 166 in a mistaken effort to dispense food product, causing an undesired release of pressure and/or an undesired discharge of food product. Further, because the sealing surface of the conventional relief valve assembly 150 utilizes substantially flat sealing surfaces (e.g., the surfaces defined by element 156). the described construction is such that, after a desired automatic or manual venting operation, the sealing surface of the stopper will not always properly seat against the faceplate and a desired seal will not be formed. Still further, as the sealing surface in the known design wears, the ability of the sealing surface to engage the faceplate is diminished, such that the useful operable life of the vent assembly may be limited.

The embodiments described below, avoid, minimize, or overcome some or all these limitations of the prior art, as well as other limitations and provide additional advantages.

BRIEF SUMMARY OF THE INVENTION

A brief non-limiting summary of one of the many possible embodiments of the present disclosure is a faceplate assembly including a pressure relief valve assembly for use in a pressurized food dispensing system including a faceplate, the faceplate defining a front surface, a rear surface, and a bore passing from the front surface, the bore defining a threaded opening that opens to the front surface of the faceplate and a rear opening that opens to the rear surface of the faceplate, wherein the faceplate bore defines a first cylindrical region that is interiorly threaded and a second cylindrical region and wherein the internal diameter of the first cylindrical region is greater than the internal diameter of the second cylindrical region; a vent relief assembly positioned within the faceplate, the relief valve assembly including a plug, the plug defining a threaded lower section, wherein the threaded lower section of the plug is threaded into the threaded opening defined by the faceplate, the plug further defining a bore passing through the plug, the plug further defining a first, generally cylindrical, interior region having a first diameter and a second generally cylindrical region having a second diameter, wherein the first diameter is less than the second diameter; a pin passing through the bore defined by the plug, the pin including a first end and a second end, the pin defining a recess closer to the second end than the first end, the pin further defining a first outwardly extending section having a first diameter and a second outwardly extending section defining a second diameter, where the first diameter is less than the second diameter; a first O-ring positioned about the pin and within the first interior region defined by the plug; a washer positioned about the pin and within the second interior region defined by the plug; a second O-ring positioned about the pin and within the recess defined by the pin, wherein the spring defines an interior diameter, wherein the interior diameter of the spring is greater than first diameter of the first outwardly extending section of the pin, wherein the interior diameter of the spring is less than the second diameter, and wherein the spring is positioned about the pin element such that the first outwardly extending section is contained within the interior diameter of the spring, and the spring second end that abuts the second outwardly extending section; and wherein the pin second end defines a generally conical section and wherein the pin is movable between a closed position in which the generally conical section extends into the second generally cylindrical region of the bore defined by the faceplate and a seal is formed between the second O-ring and a surface defined by the faceplate and an open position in which the generally conical section extends into the second generally cylindrical region of the bore defined by the faceplate and an opening is formed between the second O-ring and a surface defined by the faceplate.

Additionally, or alternately, an embodiment of the present disclosure may take the form of a pressurized food dispensing system comprising: a temperature-controlled vessel in the form of a barrel that is pressurized during operation of the dispensing system; a faceplate coupled to one end of the barrel, the faceplate defining a relief passage that extends through the faceplate into the barrel, the faceplate further including a dispense valve; a touch-screen interface capable of activating the dispense valve; a relief valve assembly coupled to the face plate, the relief valve assembly including: a plug coupled to the face plate and extending at least partially into the relief passage defined by the faceplate, the plug defining a bore passing through the plug; an outer knob element adapted to be releasably coupled to plug, the outer knob element defining a bore passing through the outer knob element; a pin, the pin having a first, generally conical end and a second end, the pin defining a recess between the generally conical element and the second end, wherein the pin is positioned such that it passes through both the bore defined by the plug and the bore defined by the outer knob element; an inner knob element coupled to the second end of the pin; a spring positioned about the pin element between the plug and the generally conical end of the pin element; and a first O-ring positioned within the pin recess; wherein, the spring biases the relief valve assembly towards a closed orientation in which the generally conical element extends into the relief passageway defined by the faceplate and first O-ring is compressed against a portion of the faceplate by the spring to form a seal.

None of these brief summaries of the inventions is intended to limit or otherwise affect the scope of the appended claims, and nothing stated in this Brief Summary of the Invention is intended as a definition of a claim term or phrase or as a disavowal or disclaimer of claim scope.

BRIEF DESCRIPTION OF THE DRAWINGS

The following figures form part of the present specification and are included to demonstrate further certain aspects of the present invention. The invention may be better understood by reference to one or more of these figures in combination with the detailed description of certain embodiments presented herein.

Figures 1A, 1B, 1C:
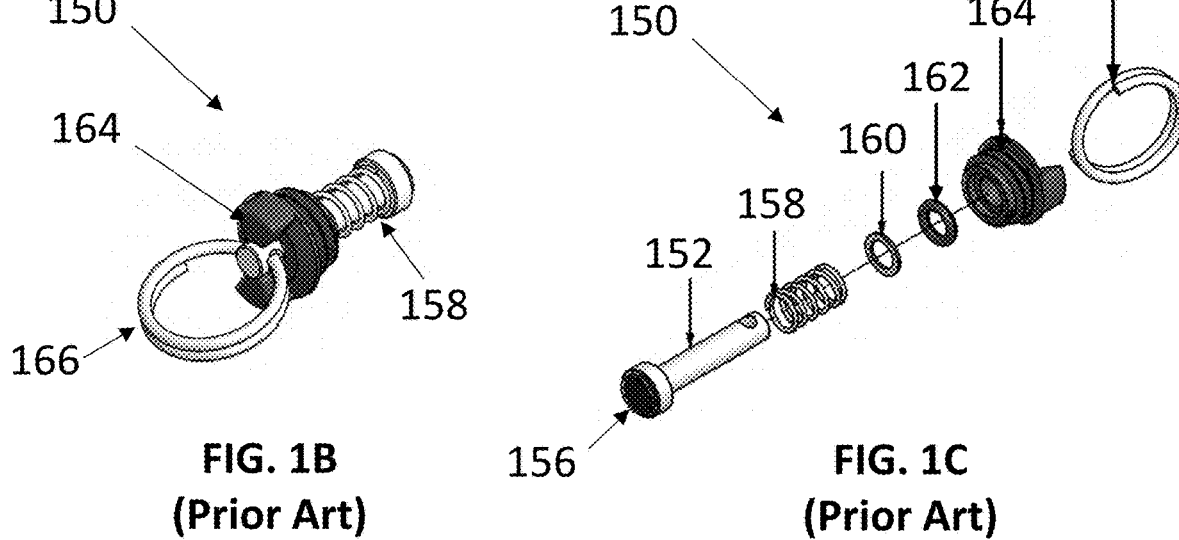
FIGS. 1A-1C illustrate one known vent relief assembly that can be used in conjunction with a food dispensing system and in particular in conjunction with a frozen carbonated beverage dispensing system.

While the inventions disclosed herein are susceptible to various modifications and alternative forms, only a few specific embodiments have been shown by way of example in the drawings and are described in more detail below. The figures and detailed descriptions of these embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts illustrated and taught by the specific embodiments.

DETAILED DESCRIPTION

The Figures described above, and the written description of specific structures and functions below, are not presented to limit the scope of what has been invented or the scope of the appended claims. Rather, the Figures and written description are provided to teach any person skilled in this art to make and use the inventions for which patent protection is sought.

A person of skill in this art having benefit of this disclosure will understand that the inventions are disclosed and taught herein by reference to specific embodiments, and that these specific embodiments are susceptible to numerous and various modifications and alternative forms without departing from the inventions we possess. For example, and not limitation, a person of skill in this art having benefit of this disclosure will understand that Figures and/or embodiments that use one or more common structures or elements, such as a structure or an element identified by a common reference number, are linked together for all purposes of supporting and enabling our inventions, and that such individual Figures or embodiments are not disparate disclosures. A person of skill in this art having benefit of this disclosure immediately will recognize and understand the various other embodiments of our inventions having one or more of the structures or elements illustrated and/or described in the various linked embodiments. In other words, not all possible embodiments of our inventions are described or illustrated in this application, and one or more of the claims to our inventions may not be directed to a specific, disclosed example. Nonetheless, a person of skill in this art having benefit of this disclosure will understand that the claims are fully supported by the entirety of this disclosure.

Those persons skilled in this art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

Further, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the scope of what is claimed.

Reference throughout this disclosure to "one embodiment," "an embodiment," "an example" or similar language means that a particular feature, structure, or characteristic described in connection with the embodiment is included in at least one of the many possible embodiments of the present inventions. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of one embodiment may be combined in any suitable manner in one or more other embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. Those of skill in the art having the benefit of this disclosure will understand that the inventions may be practiced without one or more of the specific details, or with other methods, components, materials, and so forth. In other instances, well-known structures, materials, or operations are not shown or described in detail to avoid obscuring aspects of the disclosure.

Figure 2A:
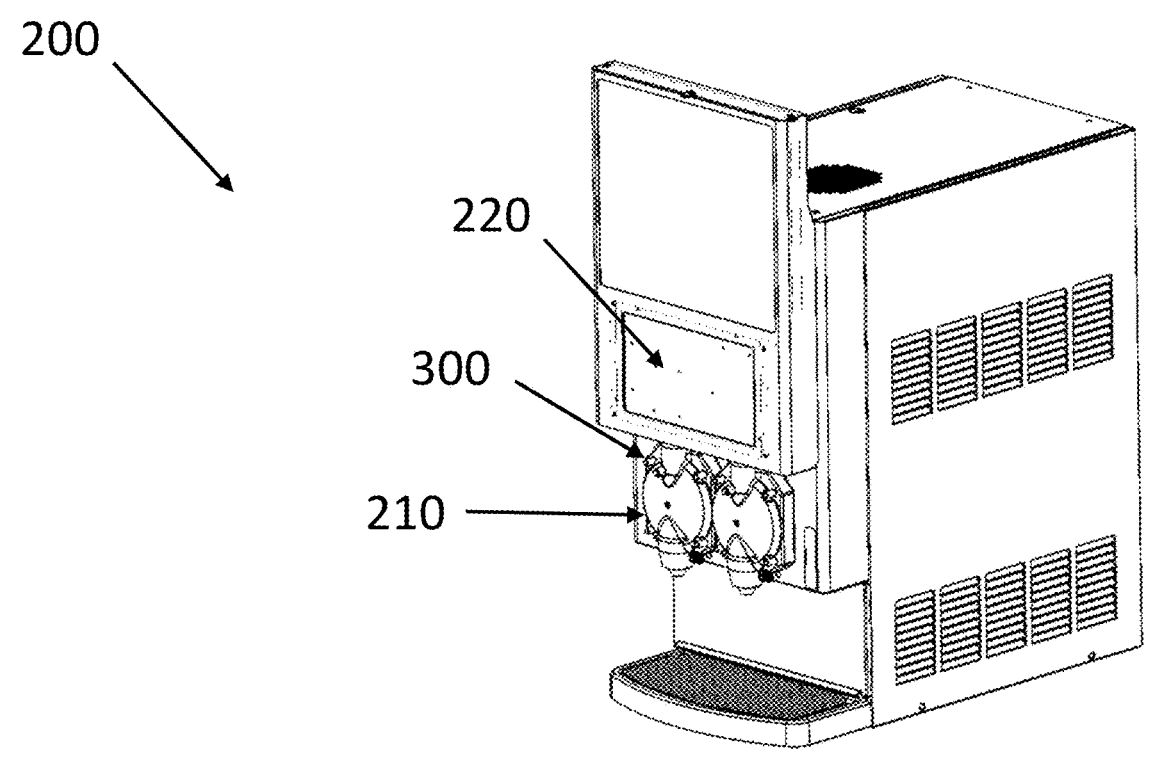
FIGS. 2A-2B illustrate a food dispensing system 200 reflecting aspects of the present disclosure.

The description of elements in each Figure may refer to elements of proceeding Figures. Like numbers refer to like elements in all figures, including alternate embodiments of like elements Turning to the drawings and, in particular to FIGS. 2A-2B, a food dispensing system 200 reflecting aspects of the present disclosure is illustrated. In one example, the food dispensing system takes the form of a sealed pressurized system that includes a temperature-controlled food containing vessel, in the form of—for example—a barrel into which a food product may be fed. The food product may take the form of an ice-cream product, a smoothie product, a frozen carbonated beverage product, a soup product (to be served hot or cold), or any other food product. In the example of FIG. 2A, the illustrated system is a two-barrel system.

In the example of FIG. 2A, each barrel is associated with a face plate 210, one of which is labeled in FIG. 2A.

In the example of FIG. 2A, the illustrated system includes a touch screen interface 220 and each face plate includes within it a pneumatically or electrically operated dispense valve that can be activated through interaction with the touchscreen. As reflected in FIGS. 2A and 2B, in the illustrated embodiment, the vent relief assembly 300 is positioned such that it is visible to a user of the food dispensing system 200 when the user is seeking to have a food product dispensed by the dispensing system 200.

Figure 2B:
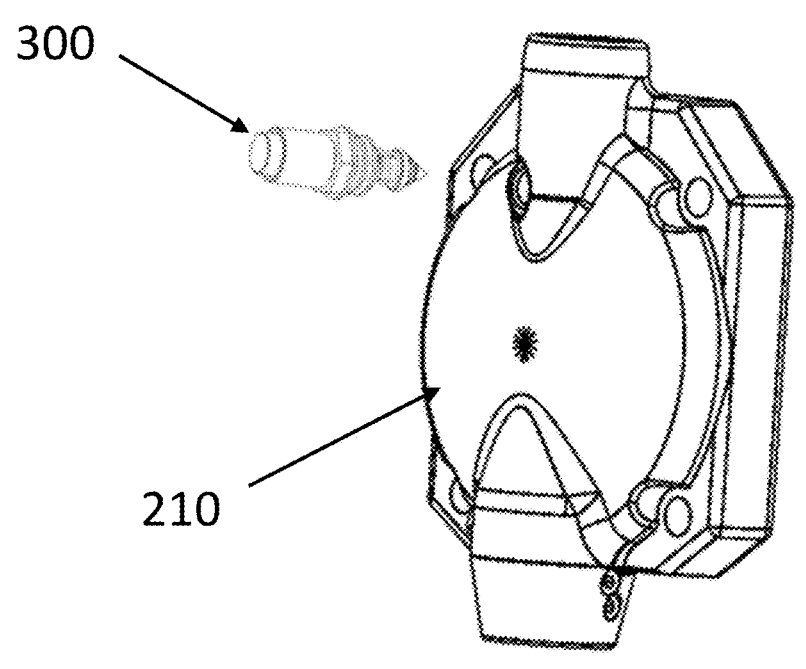

As reflected in FIGS. 2A and 2B, vent relief assembly 300 is coupled to each face plate 210.

Figures 3A, 3B, 3C:
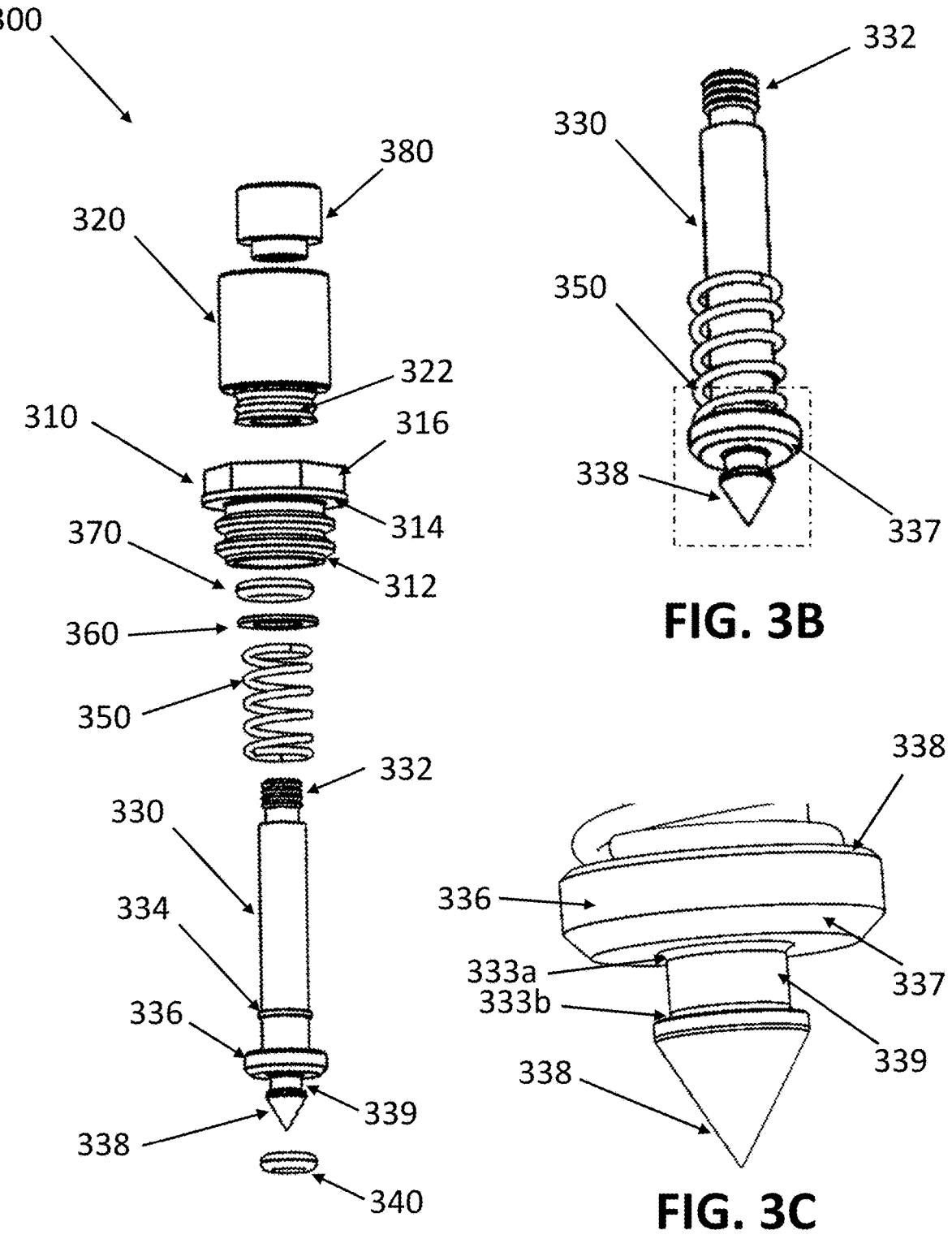
FIG. 3A provides an exploded view of an exemplary vent relief valve assembly 300 constructed in accordance with certain teachings of this disclosure.
FIG. 3B illustrates a sub-set of the components illustrated in FIG. 3A.
FIG. 3C illustrates further details of the pin element 310 from FIG. 3B and, in particular, details of the portion of the pin element 330 contained within the dashed box of FIG. 3B.

FIG. 3A provides an exploded view of an exemplary vent relief valve assembly 300 constructed in accordance with certain teachings of this disclosure.

FIG. 3B illustrates a sub-set of the components illustrated in FIG. 3A.

Figure 4:
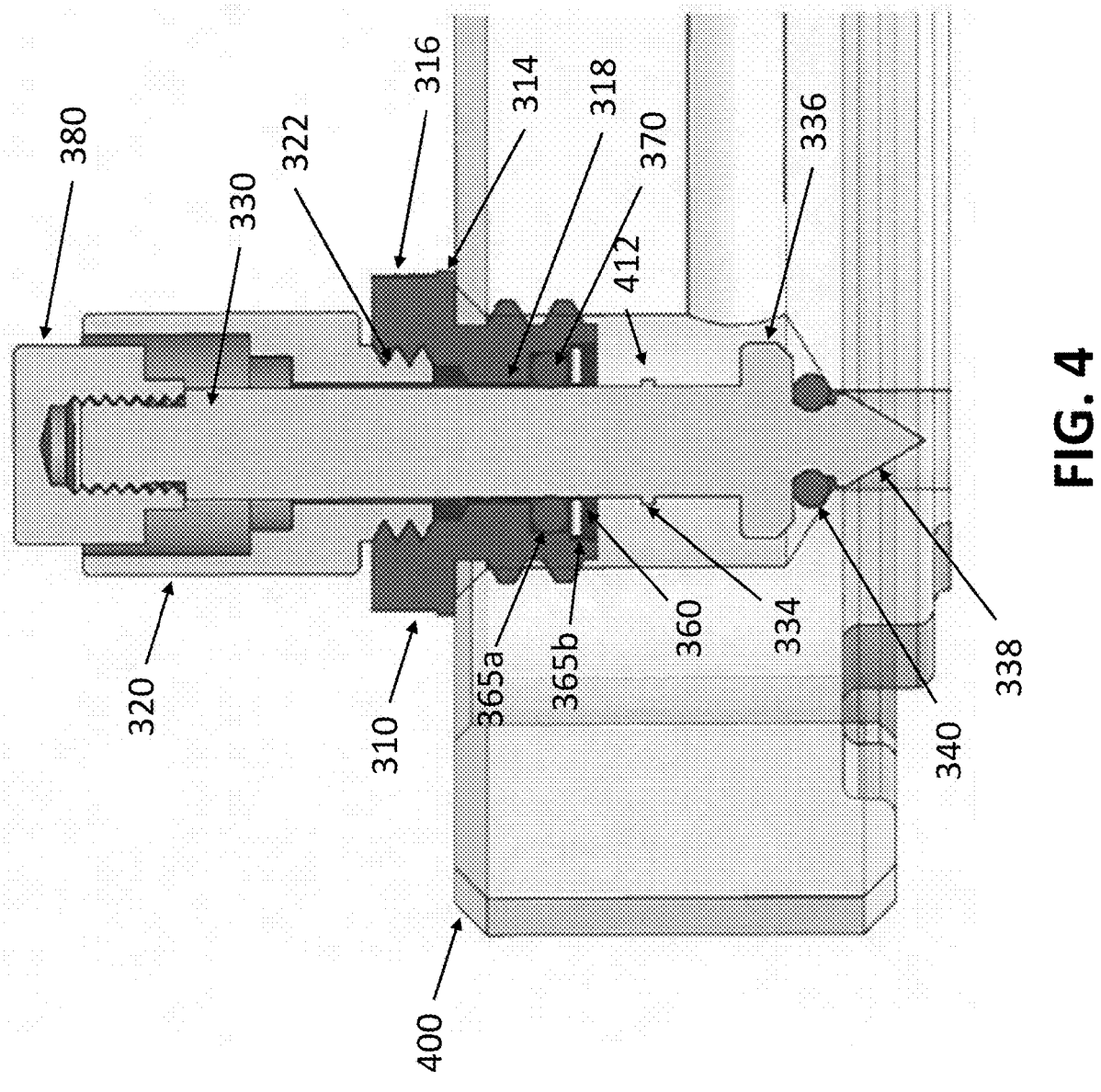
FIG. 4 illustrates many of the components of the exemplary vent relief assembly 300 of FIG. 3A, as those components could be arranged when the vent relief assembly 300 is coupled to a faceplate 400.

FIG. 4 illustrates most of the components of the exemplary vent relief assembly 300 of FIG. 3A, as those components could be arranged when the vent relief assembly 300 is coupled to a faceplate 400. For ease of illustration, FIG. 4 does not specifically illustrate spring element 350, discussed in more detail below. It should be understood that the faceplate 400 depicted in FIG. 4 may take any suitable form. In the example of FIG. 4, the faceplate 400 takes the form of the known faceplate shown generally in FIG. 1A.

As reflected in FIG. 4, the faceplate defines a relief passage that extends through the faceplate into, for example, a barrel that is pressurized during operation of a food dispensing system.

Referring to FIG. 3A the illustrated exemplary vent relief valve assembly 300 includes a plug 310. As shown in the figure, while the plug 310 may be formed of any suitable material, in one embodiment, the plug 310 is formed from a suitable material, such as glass-filled nylon or a thermoplastic polymer, like Poly-keytone M630F. As reflected in the referenced figures, the exemplary plug is coupled to the faceplate and extends at least partially into the relief passage defined by the faceplate. The illustrated plug further defines a bore passing through the face plate.

As shown in FIG. 3A and FIG. 4, the plug 310 is formed in such a manner that it has a threaded lower section 312 (not labeled in FIG. 4), an intermediate section 314, and an upper engaging section 316. In the example, the threads defined by the threaded lower section 312 are such that the can engage with threads defined about the interior of an opening 412 passing through the faceplate 400 so as to position the plug 310, and this the vent relief assembly 300, at least partially within the faceplate 400. While any suitable thread size may be use, in one embodiment, course threads are utilized to minimize the potential for cross-threading.

The intermediate section 314 of the plug 310 may be formed such that, when the assembly 300 is properly positioned within an opening of a faceplate, the intermediate section abuts a surface of the faceplate. In the example of FIG. 3A, the intermediate section 314 takes the form of a disc. As reflected in FIG. 4, in the illustrated example, when the plug 310 is positioned within the faceplate 400, an outer surface of the plug 310 associated with the intermediate section 314 abuts an outer surface of the faceplate 400.

As also shown in FIGS. 3A and 4, the upper engaging section 316 of the plug 310 provides a surface that can be used to place and position the plug 310 within a faceplate and/or remove the plug from a faceplate. In one example, the upper engaging section 316 provides an outer surface that can be engaged by a tool to permit the plug 310 to be screwed into a faceplate. In the specific example, of FIGS. 3A and 4, the upper engaging section 316 defines a nut-like outer surface that can be engaged with fingers, a wrench, or another suitable tool (e.g., a pair of pliers) to screw the plug 310 into a face plate (thereby coupling the vent relief valve assembly 300 with the faceplate) and/or remove the plug 310 (and thus the vent relief valve assembly 300) from the faceplate.

As further shown in FIGS. 3A and 4, and best shown in FIG. 4, the plug 310 defines a central bore that passes longitudinally (from top to bottom in FIGS. 3 and 4) through the plug 310. In the illustrated example, the plug 310 is formed such that the longitudinal bore defines a first portion 317 having a first cross sectional diameter and defining threads about the interior of the first section, a second portion (defined by surface 318) having a second cross sectional diameter that is less than the first cross sectional diameter, where the portions of the plug 310 defining the second portion are generally smooth, and a third portion that, itself, defines a first inner region having a first diameter, and a second inner region, having a second diameter, where the second diameter is larger than the first diameter.

In the example of FIGS. 3A and 4, an outer knob element 320 is provided that, as reflected in FIG. 4, defines a bore passing longitudinally (top to bottom in the FIGS. 3 and 4) through the outer knob element 320. The outer knob element 320 further defines a lower section 322 that has a threaded outer surface. As reflected in FIG. 4, the threaded outer surface of the lower section 322 of the outer knob element 320 is such that it can be releasable coupled to the plug, by, for example, screwing the lower section of the outer knob into the threaded opening defined by the upper engaging section 316 of the plug 310.

As reflected in FIG. 4, the lower portion of the plug 310 defines a step, such that two interior regions of different dimensions (e.g., different diameters) are established. In the example of FIG. 4, the first interior region is partially defined by the sidewall portion 365a of plug 310 and the second interior region is partially defined by sidewall portion 365b of plug 310. In the exemplary embodiment, it will noted that the first interior region is located closer to an inner knob element 380 than is the second interior region. In the illustrated example, the longest cross section of the second interior region is longer than the longest cross section of the first interior region.

In the exemplary structure of FIG. 4, washer 360 is positioned about the pin 330 and within the second interior region, and O-ring 370 is positioned about the pin 330 and within the first interior region.

As reflected in FIG. 4, washer 360 is sized such that its largest outer diameter is less than the longest cross section of the second interior region (such that washer 360 fits within (and in the example of FIG. 4, completely within) the second interior region. In the example of FIG. 4, washer 360 is further sized such that its largest outer diameter is greater than the, longest cross section of the first interior region, such that the step between the first and the second interior regions within the plug 310 prevents the O-ring 360 from moving into the first interior region. This arrangement limits movement of the washer 360 relative to the plug 310. Further, because the spring element 350 will—after assembly—be exerting a spring force against the washer 360—this limitation will prevent the spring, 350 from applying a squeezing force on the O-ring, 370. Thus, in the exemplary design of FIG. 4, the squeezing forces provided by the O-ring 370 are determined primarily by the geometries of the plug 310 and the pin 330 and such squeezing forces are not impacted in any meaningful way by operation of the spring 350. This configuration allows the pressure applied by the O-ring 370 to the pin 330 to be more precisely controlled and allows the pressure at which the relief valve assembly 300 will open to be more precisely set and more consistent.

As further reflected in FIG. 4, in the illustrated example, the bore passing through the outer knob element 320 further defines an inner stepped bore that defines a first inner region 324a and a second inner region 324b. As will be apparent from FIG. 4, these stepped regions generally conform to an outer stepped surface of an inner knob 380 (discussed in more detail below), such that, if the outer knob element 320 s moved relative to the inner knob element 380, it will be possible to generally nest the inner knob element 380 within the inner stepped bore defined by the outer knob element.

As reflected in FIGS. 3A, 3B and 4, in the illustrated example, a pin element 330 passes through the open bores defined by the plug 310 and the outer knob element 320. While the pin element 330 may be formed of any suitable material, in the illustrated example, the pin element 330 is formed of stainless steel and, more specifically, of 304 stainless steel.

As shown in the figures, and best shown in FIGS. 3A and 3B, in the example, pin element 330 defines: first and second ends, a threaded upper section 332 at the second end; a first outwardly extending section 334, having a first outer diameter and a first thickness; a second outwardly extending section 336, having a second outer diameter and a second thickness, where the second outer diameter is greater than the first outer diameter and where the second thickness is greater than the first thickness; and a generally conical element positioned at the first end section 338. As shown in the figures, the second outwardly extending section 336 and the conical end section 338 are configured such that they define a recessed area 339 between them. As reflected in the figure the recess 339 is located between the generally conical element and the second end. As further reflected in the figures, the pin is positioned such that it passes through both a bore defined by the plug and a bore defined by the outer knob element.

Additional details concerning the construction of the exemplary pin element 330 are shown in FIGS. 3B-3C. As reflected in the figure, the generally conical section 338 takes the form of a cone element that terminates at a tip and that defines a conically extending outer surface. The section of the conically extending surface most distant from the tip, defines a ledge that, in part defines the recess 339. As further reflected in FIG. 3B, the second outwardly extending section 336, is formed to define a generally disk-like element where the upper and lower surfaces of the disc-like element are generally flat and where the lower outer section of the disc-like element defines a chamfered surface 337.

FIG. 3C illustrates further details of the pin element 330 from FIG. 3B and, in particular, details of the pin element 330 contained within the dashed box of FIG. 3B.

As illustrated in FIG. 3C the section of the pin element 310 that is within the recess 339 may have a curved upper section 333a and/or a curved lower section 333b. Such curved sections can optimize the positioning, retention and/or compression of a first O-ring 340 (discussed below).

Additionally, as also shown in FIG. 3C, the upper and lower outer surfaces of the second outwardly extending section 336 may define an upper chamfered surface 338 and a lower chamfered surface 337.

Referring to FIGS. 3A and 4, it may be noted that in the illustrated example, a first 340 is positioned about the pin element 310 and within the recess 339. In the example of FIG. 3C, the curved sections of the pin element 330 defining the recess 339 will tend to cause the first O-ring 340 to be compressed both axially and radially. Such compression will tend to ensure that compressive forces are applied to the first O-ring 340 over its entire useful life, even if portions of the first O-ring 340 were to wear away during operation.

Referring to FIGS. 3A and 3B, it will be seen that, in the illustrated example, a spring element 350 (not shown in FIG. 4) is provided that is placed about the pin element 310. The spring element 350 may be formed from any suitable material, such as stainless steel.

As best shown in FIG. 3B the spring 350 defines an inner diameter that is larger than the outer diameter of the first outwardly extending portion 334 of the pin element 310, such that the portion of the pin element 310 that defines the first outwardly extending section 334 is located within the interior of a bore defined by the spring element 350. As further reflected in FIG. 3B, the outer diameter of the spring element 350 is such that it is less than the outer diameter of the second outwardly extending section 336 of the pin element 310 such that a portion of the spring element 350 (the lower portion in FIG. 3B) abuts a surface defined by the second outwardly extending section 336 (an upper surface in FIG. 3B).

As reflected in FIG. 3A and as may be inferred from FIG. 4, when the relief valve assembly 300 under discussion is fully assembled, a washer element 360 and a second O-ring 370 are positioned between the spring element 350 and the plug 310. As best shown in FIG. 4, the washer element 360, which may be formed of stainless steel, provides a surface against which an end of the spring element 350 may act. In the example under discussion, the washer element 360 defines an inner opening having a diameter that is less than the outer diameter of the first outwardly extending portion 334 of the pin element 310.

As also shown in FIG. 4, in the illustrated example, the second O-ring 370 is positioned between the washer 360 and a surface of the plug 310 such that, in the example, the second O-ring 370 is compressed, in part, by the action of the spring 350 against the washer 360. It will be appreciated that one of the functions of the second O-ring 370 is to form a seal between the pin element 330 and the plug 310.

As still further shown in FIGS. 3A and 4, in the assembled valve assembly 300, an inner knob element 380 is attached to the upper threaded portion 332 of the pin element 330. In the illustrated example, the inner knob element 380 is formed of stainless steel, although other materials may be used. As reflected in the figures, the outer surface of the knob element that faces a user of the dispensing system 300 during a dispense operation (i.e., the top portion of knob element 380 in FIG. 4) is generally flat. This flat surface minimizes the incentive of any user to grasp and pull on the knob element 380 in a manner that would result in an undesired pressure release. Moreover, this generally flat facing surface will have the general appearance of a button, such that any undesired user interaction with the vent relief assembly 300 will likely be an attempted depression of the knob element 380 into the faceplate. As will be appreciated, such a depression—if attempted—will not result in an undesired venting operation.

FIG. 4 shows the exemplary relief valve assembly 300 discussed above positioned within an exemplary face plate 400 during normal operation of the pressurized food dispensing system including the illustrated components. In such normal operation, the face plate 400 will be affixed to the dispensing system such that it abuts a pressurized food containment area, such as a pressurized temperature-controlled barrel. In the illustrated example, the pressurized food containment area is identified generally by reference 410.

In the illustrated example, the face plate, which may take the form of a known face plate, defines a relief passageway 412, which may take the form of a generally cylindrical tube. As reflected in FIG. 4, the conical lower portion 338 of the pin element 330 is sized such that it can extend into the relief passageway 412. Further, in the illustrated example, the components of the pin element 330 and the first O-ring 340 are sized and orientated such that the conical portion of pin element 330 extends into the relief passageway 412 to the point that a seal is formed between the faceplate 400 and the first O-ring 340.

As further reflected in FIG. 4, the illustrated faceplate further defines a drainage passageway 414, in fluid connection with the relief passageway 412, for draining any product passing into the relief passageway when the vent relief assembly 300 is opened.

Referring to FIG. 4, operation of the relief valve assembly 300 as an automatic relief valve will be described. During normal operation the first O-ring 340 will be compressed against the faceplate 400 by action of the spring 350 (which will be partially compressed) such that the first O-ring 340 seals against the faceplate 400.

During operation of the food dispensing system, the pressure within the food containment area will act on the surface of the conical portion 338 of the pin element 330. This pressure, however, is insufficient to cause movement of the pin element 330 because, in the illustrated example, the spring constant of the spring 350 is selected to maintain the seal between the first O-ring 340 and the faceplate under such circumstances. If, however, the pressure within the food containment area rises above a certain threshold, the pressure acting on the outer surface of the pin element 330 will be such that it will cause the pin element 330 to move (upwardly in the example of FIG. 4) such that the seal between the first O-ring and the face plate will be broken. This will create a passageway through which material within the containment area 410 can flow from the containment area, through the relief passageway 412, and into and out of the drain passageway 414. Notably, seal created between the pin element 330 and the second O-ring 370 will tend to block the passage of fluid through the lock nut 310.

The flow of material through relief passageway 412 and drain passage 414 can cause a reduction in the pressure within the containment area 410 that, once it drops to a sufficiently low level, will result in a force that is less than the force acting to force the first 340 against the faceplate, such that the first O-ring 340 will return to the position reflected in FIG. 4, where the O-ring 340 is sealed against the faceplate.

It will be appreciated that the components of FIG. 4 provide a robust vent relief valve that has several beneficial advantages over other vent relief valves. For example, in the example of FIG. 4, the components are dimensioned such that at least a portion of the conical end portion 338 of the pin element 330 remains within the interior of the relief passageway 412. Because of this, the pin element 330 is to a large extent self-aligning and self-centering with respect to the relief passage 412. In the illustrated example, if the pin-element is moved to a position where the seal between the O-ring 340 and the face plate 400 is broken, the conical shape of the lower portion of the pin element 330 will tend to bring the pin-element 330 into alignment with the relief passageway 412, at least in the sense that the shape of the conical portion 338 will tend to bring the longitudinal axis of the pin element 330 in line with the longitudinal axis of the relief passageway 412.

A further advantage of the described exemplary relief valve assembly 300 is that it creates a seal about a significant portion of the first O-ring 340. As such, if the O-ring 340 wears during use there will still be a large surface area to provide the desired seal.

As described in the Background section, above, during operation of a pressurized food dispensing system, it may become necessary to manually release the pressure within the food containment area. This may be necessary, for example, during an operation where material is being supplied to the food containment area, such as when a liquid drink component is provided to a freezing barrel before freezing. FIGS. 4 and 5A-5C illustrate how a manual pressure release may be accomplished using the described exemplary embodiment and how an undesired manual release can be avoided.

Turning first to FIG. 4, it will be noted that for the illustrated example, during normal operation, only a small portion of the inner knob element 380 extends outside the outer knob element 320. In the illustrated example, the outer knob element 380 and the inner knob element 320 are dimensioned such that the portion of the inner knob element 380 that extends outside of the inner knob element 320 is so small that it cannot be readily grasped by a human hand. As such, in the orientation reflected in FIG. 4, it is very difficult—if not impossible—for a human to grasp the inner knob element 380 and manually relieve pressure within the food containment area. Undesired manual releases (e.g., by one not authorized to engage in such a process) are therefore inhibited.

While the dimensions can vary, in one embodiment, the exposed length of the outer knob element 320 in its normal resting position (where it is screwed into the plug 310) is approximately 0.571 inches, the and the exposed portion of the inner knob 380 is approximately 0.130 inches. Such a small, exposed area of the inner knob 380, generally prohibits grasping of the inner knob element 320 by the human hand in this rest position.

In the example of FIG. 4, however, the small portion of the inner knob element 380 that extends outside the outer knob element 320, however, is such that the inner knob element 380 can be jarred by a human user. Such jarring can be helpful if the orientation of the pin element 330 with respect to the faceplate 400 needs to be slightly adjusted to ensure a proper seal between the first O-ring 340 and the faceplate 400. Such slight adjustments, however, may be unnecessary or seldom because of the self-aligning and self-centering nature of the illustrated exemplary embodiment.

In the exemplary embodiment discussed above, the spring 350 tends to bias the relief valve assembly towards a closed position. Such a closed position is illustrated in FIG. 4. As that figure shows, when the illustrated relief valve assembly is in a closed orientation, the generally conical element defined by the pin 338 extends into the relief passage defined by the faceplate and the O-ring 340 is compressed against a portion of the faceplate to form a seal.

Figures 5A, 5B, 5C:
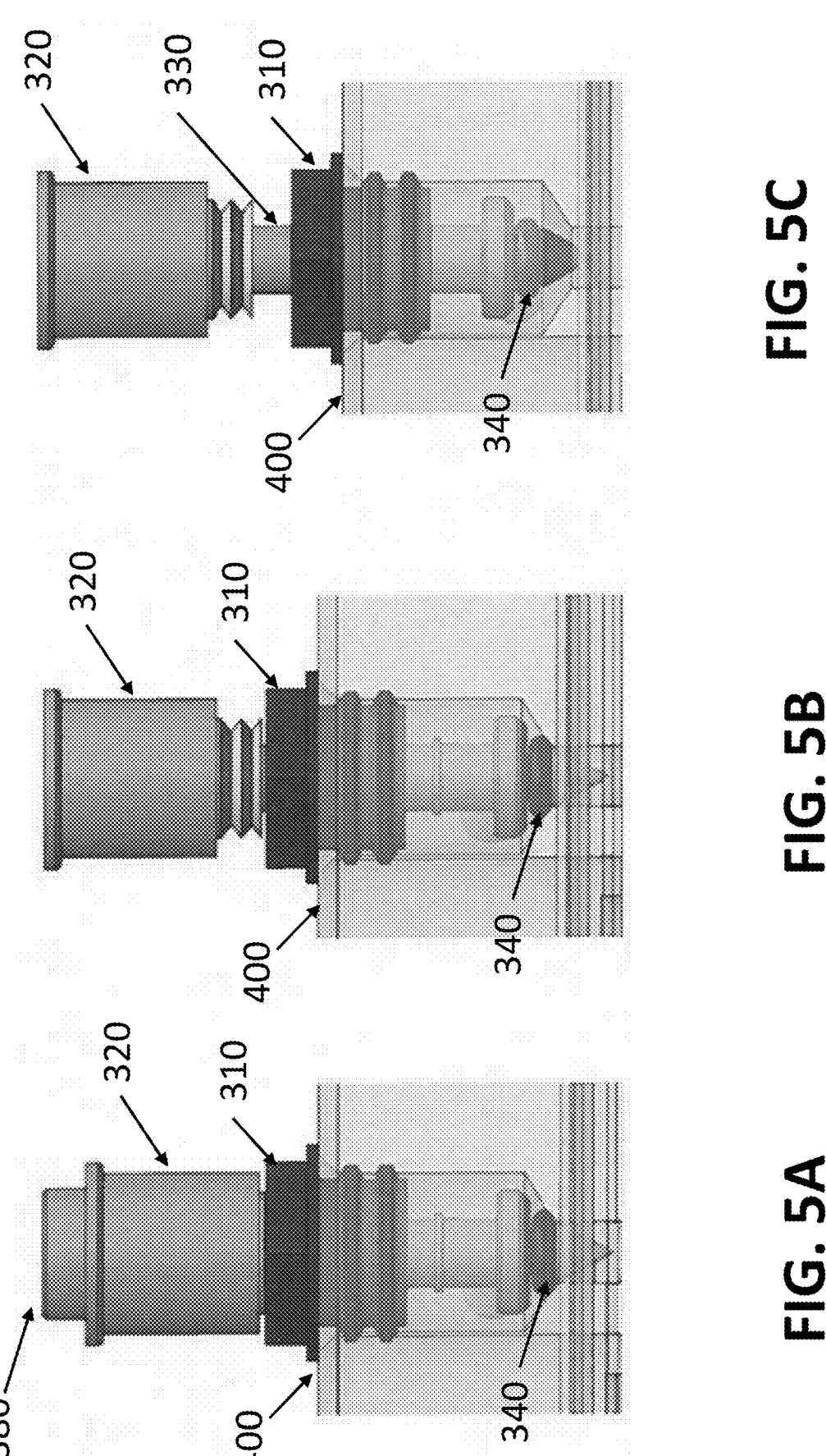
FIGS. 5A-5C illustrate how a manual pressure release may be accomplished using the described exemplary embodiment and how an undesired manual release can be avoided.

Referring to FIGS. 4 and 5A-5C, it will be noted that, in a normal operating condition, the outer knob element 320 is screwed into the plug 310. Because the lower portion of the outer knob element 320 is screwed into an inner surface of the plug 310, however, the outer lock knob can be unscrewed, e.g., by rotation, such that the outer knob element can be separated from, and moved away from the plug 310. This orientation is shown in FIG. 5B.

As will be appreciated by considering FIG. 5B and FIG. 4, once the outer knob element 320 is separated from the faceplate, it can be moved away from the plug 310 to a point where it will make contact with one or more outer surfaces of the inner knob element 380. As reflected in FIG. 4, in the illustrated example, this will occur as the inner knob element 320 is moved upwardly to the point where the lower surfaces of the inner knob element 380 mate within the upper interior surfaces of the outer knob element 320. Once this point is reached, further axial movement of the outer knob element 320 away from the plug 310 will cause the pin element 330 to move away from the faceplate 330 to the point that the seal between the first O-ring 380 and the face plate 400 is broken and a relief passageway provided as described above. This orientation is shown in FIG. 5C.

Referring to FIG. 4, it will be appreciated that the extent of possible manual movement of the pin element 330 away from the faceplate 400 is limited by the interaction between the washer 360 and the first outwardly extending portion 334 of the pin element 330. Specifically, as the pin element 330 is manually moved away from the faceplate 400 a point will be reached where the first outwardly extending portion 334 defined by the pin element 330 abuts the washer 360 and further movement of the pin element 330 away from the faceplate 400 will be restricted or prevented. In the exemplary embodiments discussed herein, the dimensional location of the first outwardly extending portion 334 is intentionally selected to limit the extent that the spring 350 can be compressed during normal operation of the vent relief assembly 300. Through selective location of the first outwardly extending portion 334, deformation of the spring 350 from over compression can be avoided.

Referring to FIG. 3A, it will be appreciated that the relief valve assembly 300 of the present disclosure is structured such that it may be efficiently constructed. For example a method of assembly may be implemented wherein the spring 350, washer 360 and second 370 are placed about the pin element 330 (in the described order) and the threaded end of the pin element 330 is then positioned in the bores passing through the plug 310 and the outer knob element 320. The inner knob element 380 may then be attached to the threaded end 332 of the pen element 330.

The outer knob element 320 may be coupled (i.e., screwed into) the plug 310 before or after the pin element 330 is passed through the bores defined by the knob element 320 and the plug 310.

At any appropriate time during the assembly process, the first O-Ring 340 may be positioned in the recess 339.

Prior to the assembly steps described above, a lubricant— e.g., a molycoat lubricant—may be applied to the pin element 330.

It will be appreciated that the embodiment described in connection with the previously discussed figures is exemplary only and that modifications can be made without departing from the teachings of this disclosure. For example, for embodiments where it may be desirable to avoid undesired manual pressure releases, buy whether slight adjustments of the pin element 330 are not required, it may be unnecessary to have any portion of the inner knob element 380 extend outside the outer knob element 320. Still further, while threads were used to couple the outer knob element 320 to the plug 310, other coupling arrangements, such as a bayonet-type connection, could be used.

Figure 6B:
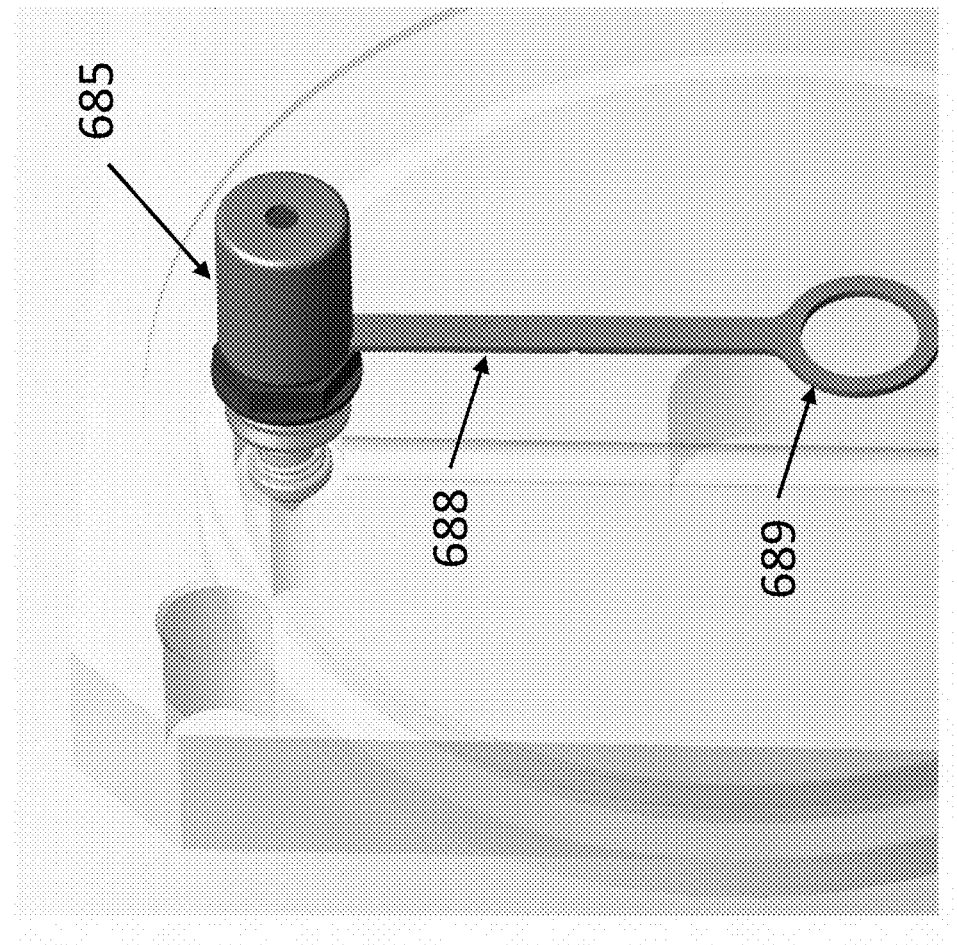
FIG. 6B illustrates a cap structure may optionally be used in connection with the embodiment of FIG. 6A to prevent undesired manual pressure release operations.
Figure 6A:
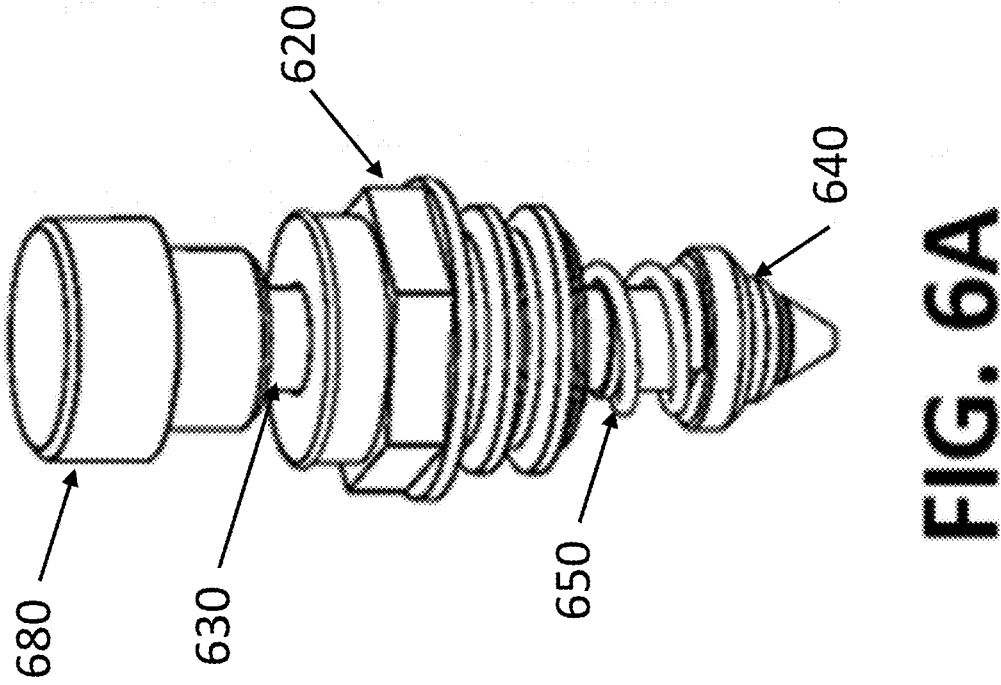
FIG. 6A provides illustrates an alternative design for an exemplary vent relief valve assembly constructed in accordance with certain teachings of this disclosure.

In addition, because the self-aligning and self-centering and improved sealing aspects of the exemplary embodiment described above are not dependent on the aspects of the exemplary embodiment related to the avoidance of an undesired manual pressure release, embodiments are envisioned utilizing the described sealing arrangement without using the inner and outer knob element assembly discussed above. FIG. 6A illustrates one such arrangement.

Referring to FIG. 6A, another exemplary embodiment of a pressure relief valve assembly 600 is illustrated that, in certain respects is similar to that discussed above. For example, the illustrated embodiment includes a pin element 630—that may be formed in a manner like that described above in connection with pin element 330—a first O-ring 640 and a spring 650 that correspond, in general and respectively, to the structure and operation of elements 330, 340 and 650 discussed above. Moreover, the illustrated embodiment of FIGS. 6A and 6B includes a knob element 680 that generally corresponds to the inner knob element 380 discussed above and washer and O-ring elements that (although not illustrated in FIGS. 6A), correspond to the washer 360 and second O-ring 370 discussed in connection with FIGS. 3A-3C and FIG. 4.

The embodiment of FIGS. 6A, further includes a plug element 620 that differs from plug 320 of FIGS. 3A-3C and 4. In the embodiment of FIGS. 6A, the plug element 620 defines a threaded lower portion for coupling to a faceplate (not illustrated) and an upper engagement portion. Because of this construction, the knob element 680 is easily graspable whenever a manual pressure release operation is desired.

To prevent undesired manual pressure release operations, a cap structure may optionally be used in connection with the embodiment of FIG. 6A. FIG. 6B shows such a cap structure 685. In the embodiment of FIG. 685, the cap structure 685 includes a cap portion, that may be positioned over the knob element 680 and the exposed portion of the pin element 630, during normal operation. A technician or authorized used, could then remove the cap portion whenever a manual pressure release operation is desired.

As further illustrated in FIG. 6B, the cap structure 685 may optionally include a tether element. As reflected in FIG. 6B such a tether element may include an extending potion 688, which in FIG. 6B takes the form of a strap-like structure, and a connecting portion 689, which in FIG. 6B takes the form of a structure defining a circular opening. Although not illustrated as it would be used in FIG. 6B, during actual use, the threaded portion of the plug element 610 would be passed through the opening defined by the connecting portion 689 before the plug was screwed into the faceplate 400 to which the illustrated vent relief assembly 600 as attached. In that manner, when the cap portion of the cap structure 685 is removed from covering the knob 680 and the exposed pin element 630, the cap structure 685 will remain attached to the faceplate 400. The cap structure 685 may be formed from rubber, flexible plastic, or any other suitable material.

Other and further embodiments utilizing one or more aspects of the inventions described above can be devised without departing from the spirit of Applicant's invention. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to protect fully all such modifications and improvements that come within the scope or range of equivalent of the following claims.

What is claimed is:

1. A pressurized food dispensing system comprising:
   a temperature-controlled vessel in the form of a barrel that is pressurized during operation of the dispensing system;
   a faceplate coupled to one end of the barrel, the faceplate defining a relief passage that extends through the faceplate into the barrel, the faceplate further including a dispense valve;
   a touch-screen interface capable of activating the dispense valve;
   a relief valve assembly including:
      a plug coupled to the face plate and extending at least partially into the relief passage defined by the faceplate, the plug defining a bore passing through the plug;
      an outer knob element adapted to be releasably coupled to the plug, the outer knob element defining a bore passing through the outer knob element;
      a pin, the pin defining a first conical end and a second end, the pin defining a recess between the conical end and the second end, wherein the pin is positioned such that it passes through both the bore defined by the plug and the bore defined by the outer knob element;
      an inner knob element coupled to the second end of the pin;
      a spring positioned about the pin between the plug and the conical end of the pin; and
      a first O-ring positioned within the pin recess;
      wherein, the spring biases the relief valve assembly towards a closed orientation in which the conical end extends into the relief passageway defined by the faceplate and the first O-ring is compressed against a portion of the faceplate by the spring to form a seal.

2. The pressurized food dispensing system of claim 1 wherein the dispense valve is a pneumatically actuated dispense valve.

3. The pressurized food dispensing system of claim 1 wherein the pressurized food dispensing system is adapted to dispense a frozen carbonated beverage.

4. The pressurized food dispensing system of claim 1 wherein the plug defines a step that defines a first interior region having a first diameter and a second interior region having a second diameter, and wherein a second O-ring is positioned about the pin within the first interior region, a washer is positioned about the pin within the second interior region, and the spring defines a first end that abuts the washer.

5. The pressurized food dispensing system of claim 4 wherein the pin further defines a first outwardly extending section having a first diameter and a second outwardly extending section having a second diameter, wherein the spring defines an interior diameter that is greater than the first diameter and less than the second diameter, and wherein the spring is positioned about the pin such that the first outwardly extending section is contained within the interior diameter of the spring, and wherein the spring defines a second end that abuts the second outwardly extending section.

6. The pressurized food dispensing system of claim 5 wherein the washer defines an interior diameter that is less than the first diameter of the first outwardly extending section, and wherein abutment of the washer with the first outwardly extending section of the pin limits the extent to which the pin can move relative to the plug.

7. The pressurized food dispensing system of claim 4 wherein the first O-ring is not compressed by the force of the spring and wherein the second O-ring is compressed both axially and radially.

8. A pressurized food dispensing system comprising:

a temperature-controlled vessel in the form of a barrel that is pressurized during operation of the dispensing system;

a faceplate coupled to one end of the barrel, the faceplate defining a relief passage that extends through the faceplate into the barrel, the faceplate further including a dispense valve;

a touch-screen interface capable of activating the dispense valve;

the faceplate defining a front surface, a rear surface, and a bore, the bore defining a first cylindrical region that is interiorly threaded and a second cylindrical region and wherein the internal diameter of the first cylindrical region is greater than the internal diameter of the second cylindrical region;

a vent relief assembly positioned within the faceplate, the valve relief assembly including:

a plug, the plug defining a threaded lower section threaded into the interiorly threaded cylindrical region defined by the faceplate, the plug further defining a bore passing through the plug, the plug further defining a first, generally cylindrical, interior region having a first diameter and a second generally cylindrical region having a second diameter, wherein the first diameter of the bore first interior region is less than the second diameter of the bore second interior region;

a pin passing through the bore defined by the plug, the pin including a first end and a second end, the pin defining a recess closer to the second end than the first end, the pin further defining a first outwardly extending section having a first diameter and a second outwardly extending section defining a second diameter, where the first diameter is less than the second diameter;

a first O-ring positioned about the pin and within the first interior region defined by the plug;

a washer positioned about the pin and within the second interior region defined by the plug;

a second O-ring positioned about the pin and within the recess defined by the pin, wherein the spring defines an interior diameter, wherein the interior diameter of the spring is greater than first diameter of the first outwardly extending section of the pin, wherein the interior diameter of the spring is less than the second diameter, and wherein the spring is positioned about the pin such that the first outwardly extending section is contained within the interior diameter of the spring, and the spring second end that abuts the second outwardly extending section; and wherein the pin second end defines a conical section and wherein the pin is movable between a closed position in which the conical section extends into the second cylindrical region of the bore defined by the faceplate and a seal is formed between the second O-ring and a surface defined by the faceplate and an open position in which the generally conical section extends into the second cylindrical region of the bore defined by the faceplate and an opening is formed between the second O-ring and a surface defined by the faceplate.

9. The pressurized food dispensing system of claim 8 wherein the plug is formed of a material including glass-filled nylon.

10. The pressurized food dispensing system of claim 8 wherein the plug further defines an intermediate section, wherein the intermediate section is a disc, and wherein an outer surface of the plug associated with the intermediate section abuts the outer surface of the faceplate.

11. The pressurized food dispensing system of claim 8 further comprising a first knob coupled to the first end of the pin.

12. The pressurized food dispensing system of claim 11 wherein the plug further defines an upper internally threaded section and further comprising an outer knob element, the outer knob element defining a bore through which the pin passes, and a lower externally threaded section, the outer knob element further defining a recess, and wherein the outer knob element can be placed into a first position in which the lower externally threaded section of the knob element engages with the upper internally threaded section of the plug and into a second position in which the lower externally threaded section of the knob element does not engage with the upper internally threaded section of the plug, and where the first knob is at least partially positioned within the recess defined by the outer knob in both the first and second positions.

13. The pressurized food dispensing system of claim 12 wherein, in the first position of the outer knob element, a portion of the first knob extends outside of the recess defined by the outer knob element and wherein the extent to which the first knob extends outside of the recess is so small that it cannot be readily grasped by a human hand.

14. The pressurized food dispensing system of claim 13 wherein, in the first position of the outer knob element, movement of the pin from its closed position to its open position is permitted.

15. The pressurized food dispensing system of claim 11 further comprising a cap structure including a cap that may be releasably positioned to cover the first knob.

16. A pressurized food dispensing system comprising:

a temperature-controlled vessel in the form of a barrel that is pressurized during operation of the dispensing system;

a faceplate coupled to one end of the barrel, the faceplate defining a relief passage that extends through the faceplate into the barrel, the faceplate further including a dispense valve;

a touch-screen interface capable of activating the dispense valve;

a pressure release vent assembly for use in a pressurized food dispending system comprising:

a plug, the plug defining a bore passing through the plug;

an outer knob adapted to be releasably coupled to the plug, the outer knob defining a bore passing through the outer knob;

a pin that defines a first end and a second, wherein the pin is positioned such that it passes through both: (a) the bore defined by the plug and (b) the bore defined by the outer knob;

an inner knob element coupled to the first end of the pin;

a spring positioned about the pin between the plug and the second end of the pin;

wherein the pin is movable between a first position where the spring is in a first state of compression and a second position where the spring is in a second state of compression and wherein the extent of the compression in the second state of compression is greater than the extent of compression in the first state;

wherein the outer knob and the inner knob are configured such that:

the pin is biased towards the first position;

when the outer knob is released from the plug, a user can move the outer knob to a position where it engages with the inner knob, such that movement of the outer knob can result in movement of the pin from the first position to the second position.

17. The pressure release vent assembly of claim 16 wherein, when the outer knob is coupled to the plug, the inner knob is at least partially exposed such that a user can interact with, and jar, the inner knob.

18. The pressure release vent assembly of claim 17 wherein, when the outer knob is coupled to the plug, the length of the inner knob that is exposed and available for potential human grasp is less than approximately 0.15 inches.

19. The pressure vent assembly of claim 16 further comprising an O-ring positioned about the pin and between the pin and the plug.

20. The pressure vent assembly of claim 16 wherein the outer knob element is releasable coupled to the plug through a threaded connection.

* * * * *